United States Patent Office

3,494,980
Patented Feb. 10, 1970

---

3,494,980
DYEABLE POLYOLEFINS CONTAINING BASIC POLYAMIDES REACTED WITH STRONGLY IONIZED ACIDS
Gerard Lees and James Eric McIntyre, Harrogate, and Joseph Oldham, Manchester, England, assignors to Imperial Chemical Industries Limited, London, England, a corporation of Great Britain
No Drawing. Filed Aug. 14, 1967, Ser. No. 660,174
Claims priority, application Great Britain, Aug. 24, 1966, 37,980/66
Int. Cl. C08f 29/10
U.S. Cl. 260—857     12 Claims

---

ABSTRACT OF THE DISCLOSURE

Stereoregular polyolefine compositions having an enhanced stability and affinity for acid dyestuffs which contain a basic polymer or mixture thereof, as for example a polyamide having secondary or tertiary amino groups along the chains, at least some of said basic groups being present in the form of a salt of an acid of first dissociation constant at least $10^{-3}$.

---

This invention relates to modified olefin polymers having an improved affinity for acid dyestuffs, in particular to shaped articles formed from mixtures of stereoregular polyolefines with basic polyamides, basic polyurethanes, basic polyureas, basic polyesters or polyaminotriazoles wherein at least some of the basic groups are present in the form of a salt of a strong acid.

It is well known that articles of polyolefines can normally be dyed only with difficulty due to the complete lack of polar groups in the polymer molecule to form points of attachment for the dye molecules. It is also known to incorporate in the polyolefine, prior to the shaping process, soluble or insoluble substances which have a high affinity for various classes of dyestuffs, thus providing a homogeneous or heterogeneous polyolefine article which is dyeable.

Thus British patent specification No. 873,830 describes a dyeable polyolefine composition wherein a soluble or emulsifiable polymer, for example, a polyamide formed by the polycondensation of dicarboxylic acid with a diamine, is mixed with the polyolefine. The specific modifying polymers described in specification 873,830 are not basic polymers but the use of such basic polymers which gives improved affinity for acid dyestuffs is described, for example in British patent specifications 1,055,175 and 1,015,885. At least some basic polymers, in particular basic polyamides, have a disadvantage in that they exhibit a tendency to discolour when they or polyolefine compositions containing them, are subjected to elevated temperatures.

According to the present invention we provide a stereoregulator polyolefine composition having a high affinity for acid dyestuffs, capable of being formed into shaped articles by melt spinning, extrusion or other shaping processes, wherein the composition in addition to the polyolefine contains a basic polyamide, a basic polyurethane, a basic polyurea, a basic polyester, a polyaminotriazole or a mixture of two or more of said basic polymers, characterised in that some or all of the basic groups in said basic polymer or polymers are present in the form of a salt of a strong acid said acid having a first dissociation constant, measured in water at 25° C., of at least $10^{-3}$.

Basic polymers for use in compositions according to the invention may be prepared by first making the salt-free polymer by known processes of polycondensation and then treating the polymer with a strong acid of dissociation constant at least $10^{-3}$. Alternatively the polycondensation and partial or complete salt formation may in certain cases be combined in one step by adding the strong acid during the polycondensation. In particular, partially or completely neutralised basic polyamides may be prepared by carrying out the polycondensation in presence of oxyacids of phosphorus of dissociation constant at least $10^{-3}$. The oxyacid of phosphorus can be either an inorganic acid, as for example, phosphoric, phosphorous or hypophosphorous acid or an organic acid, as for example, an alkylphosphoric acid or a phosphonic acid represented by the formula:

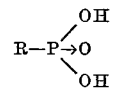

wherein R is an optionally substituted aliphatic or aryl radical. As examples of the radicals represented by R there may be mentioned methyl, ethyl, propyl, butyl, benzyl, β-phenylethyl, vinyl, cyclohexyl, phenyl and tolyl. The oxyacids of phosphorus can be used in the form of the free acid, or, if desired, they can be used in the form of the salts with amines which are preferably polyamines or diamines, which are used in the preparation of the basic polyamides. When certain oxyacids of phosphorus are to be used, in particular cyclohexylphosphonic acid, which acids have a catalytic effect on the polyamide condensation reaction polymerisation conditions should be chosen to take account of this effect.

Similarly oxyacids of phosphorus having a first dissociation constant of at least $10^{-3}$ of the foregoing inorganic or organic classes may be used to effect the neutralisation or partial neutralisation of preformed basic polymers.

Basic polyamides are made by polycondensaiton of one or more dicarboxylic acids or suitable derivatives, the acids being of aliphatic or aromatic type, with a polyamine, that is to say an amine having three or more amine groups, not more than two of which are primary amino groups, the other amino groups being secondary or tertiary groups. Optionally part of the polyamide reactant may be replaced by a diamine, an amino acid or the corresponding lactam. Thus the term basic polyamide in this specification includes a basic copolyamide.

Aliphatic acids which may be used to produce the basic polyamide are succinic, glutaric, adipic, pimelic, suberic, azelaic, sebacic and dodecanedioic acids, alkyl substituted aliphatic dicarboxylic acids and dimeric unsaturated aliphatic carboxylic acids. Aromatic, cycloalkyl, or alkylaryl dicarboxylic acids may also be used.

The preferred polyamines are the aliphatic triamines, but aliphatic or aromatic polyamines having 3 or more amino groups may also be used. Aliphatic polyamines used to obtain basic polymers according to the invention are preferably aliphatic polyamines of the formulae:

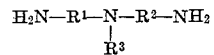

and

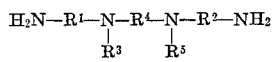

wherein $R^1$, $R^2$ and $R^4$ each independently represent alkylene radicals, preferably lower alkylene radicals containing from 1-6 carbon atoms, and $R^3$ and $R^5$ each independently represent a hydrogen atom or an alkyl radical, in particular a lower alkyl radical containing from 1-6 carbon atoms. As examples of such polyamines there may be mentioned N,N-di(β-aminoethyl)amine, N,N-di(β-amino-ethyl)methylamine, N,N-di(γ-aminopropyl)ethylamine and N,N-di(ω-amino-n-hexyl) amine.

Likewise we prefer to use aliphatic diamines in the preparation of basic copolyamides but aromatic cycloalkyl, or alkylaryl diamines also produce satisfactory basic copolyamides. Exemplary of such diamines, are ethylene diamine, trimethylene diamine and hexamethylene diamine.

Amino acids or the corresponding lactams which may be used to obtain the basic polymers for use in the invention are aliphatic amino acids which contains at least two carbon atoms between the amino and carboxylic acid groups; and as examples of such amino acids and the corresponding lactams there may be mentioned epsilon-amino caproic acid and caprolactam.

Basic polyurethanes are made, for example, by polymerisation of an aliphatic or aromatic di-isocyanate with a diol containing at least one basic group, for example a tertiary amino group which does not interact in the reaction between the isocyanate and alcohol groups. Alternatively part of (a) the diol and/or (b) the di-isocyanate reactants may be replaced by (a) a diol free of basic groups or (b) another di-isocyanate in which case a basic copolyurethane is produced. Other reactions, as for example, those listed in "Fibres from Synthetic Polymers" 1953 (Elsevier) by R. Hill may also be used to prepare basic polyurethanes or copolyurethanes.

Polyaminotriazoles are conveniently made by reaction of an excess of an aqueous solution of hydrazine with dicarboxylic acids or suitable derivatives thereof, as for example esters, amides or dihydrazides. For production of aminotriazole copolymers, mixtures of one or more dicarboxylic acids or their derivatives together with a small amount of monocarboxylic acid or suitable derivative thereof are heated with an excess of aqueous hydrazine (conveniently employed as the 64% solution often referred to as hydrazine hydrate) when the required product separates as a solid from the aqueous reaction mixture.

Basic polyesters may be prepared by reaction of a basic diol, preferably a diol containing a tertiary amino group, with one or more dicarboxylic acids. Part of the basic diol may be replaced by a non-basic diol or alternatively a dicarboxylic acid containing a tertiary amino group, may be used in conjunction with basic and/or non-basic diols in which case a basic copolyester is produced. Esters or other derivatives of the dicarboxylic acids may be empolyed in place of the free dicarboxylic acids.

Basic polymers used in compositions according to the invention are condensation polymers, those which are substantially insoluble in water and which have a crystallite melting point (measured using a polarising microscope fitted with a hot-stage) of 50–250° C. being preferred. If desired delustrants such as titanium dioxide can be incorporated into the basic polymers of the invention.

Exemplary of acids which may be used to produce the partly or completely neutralised basic polymers for use in the invention are the mineral acids, inorganic or organic oxyacids of phosphorus, halogenated lower aliphatic monocarboxylic acids and lower aliphatic dicarboxylic acids. As hereinbefore described the oxyacids of phosphorus are particularly suitable for use during the condensation of basic copolyamides or polyamides.

Shaped articles, as for example fibres, filaments or films, formed from a stereoregular polyolefine such as isotactic polypropylene, containing a basic polymer according to the invention exhibit better depth of shade and more rapid penetration of dyestuffs and a reduced tendency to thermal discolouration than do articles formed using the un-neutralised basic polymer.

The amount of basic polymer in the polyolefine composition is to some extent dependent upon the particular polymer used and the depth of shade required in articles shaped therefrom. In general 0.5 to 20% by weight of the polyolefine, preferably 1–10% (both amounts based on the weight of the composition) is an adequate amount and this amount of additive does not interfere with the processing of the polyolefine or impair the properties of the articles shaped therefrom. As the acid dye affinity is primarily dependent upon the amount of basic groups present in the composition and as the concentration of basic groups in the added polymer may vary, we prefer to control the amount of added polymer by means of the concentration of neutralised and un-neutralised basic groups in the polyolefine composition. For pale dyeings as little as 70 microequivalents of total basic groups per gram of composition may be used but for the highest build-up of colour and the deepest shades a larger amount is required. In general 70–700 approximately, microequivalents of total basic groups per gram of composition is sufficient for all purposes.

It is an important feature of our invention that the basic polymer is present in wholly or partly neutralised form during the shaping process and indeed with the most effective acids it is difficult, because of their highly ionised nature, in any reasonable time to convert the basic polymer into the salt form by treating shaped articles containing unmodified basic polymers with the acid.

The present invention may be applied to any stereoregular polyolefine and we have found it to be particularly useful for enchancing the dye affinity in particular for acid dyestuffs or premetallised dyestuffs of shaped articles of stereoregular polyolefines (as for example linear polyethylene, stereoregular poly(4-methylpentene-1) or isotactic polypropylene), from which useful textile fibres or filaments may be produced by melt or solution spinning. The invention is not limited to enhancing the acid dye affinity of articles for textile uses but may be equally readily applied to other shaped articles of stereoregular polyolefines, as for example, films, moulding or extrusions.

The polyolefine composition may be prepared by intimately mixing the polymers by any method, as for example tumbling the powdered polymers together, mixing of the powdered polyolefine with a solution of the basic polymer in a volatile solvent, followed by drying and granulation of the mixture or by milling the polymers in a hot roll or Banbury mixer. Uniform and intimate mixture of the polymers may be facilitated by the addition of dispersing agents, as for example surface active agents such as long chain fatty alcohols.

The examples which follow, wherein all parts are by weight, illustrate the nature of the invention and the manner in which it may be performed. Basic and acid groups in the polymers produced in these examples are determined by titration, the total of such groups being measured including those involved in salt formation. Thus basic nitrogen is determined by titration of a solution of the basic polymer in a 70% by weight phenol in methanol solvent using 0.5 N aqueous hydrochloric acid as the titrant and Thymol Blue as the indicator. For the determination of acid groups benzyl alcohol is used as the solvent, 0.5 N potassium hydroxide in ethylene glycol as the titrant and phenolphthalein in the same solvent as the indicator.

EXAMPLE 1

Sebacic acid (62.9 parts), hexamethylene diamine (19.5 parts) and diethylenetriamine (17.6 parts) are polycondensed together with 175° C. for 6 hours, with removal of water, to provide a basic polyamide having a viscosity ratio (measured on a 1% solution in formic acid at 25° C.) of 1.3 and a basic nitrogen content of 2485 microequivalents per gram. A portion of the basic polyamide (10 parts) is added to 50 parts of a 0.1 molar aqueous solution of hydrochloric acid and the mixture is heated at 60° C. for 15 minutes and then dried at 100° C. in an oven to give a basic polyamide in which 20% of the basic amine groups are neutralised by the acid and thereby converted into the chloride salt.

The resulting solid is powdered and 10 parts are mixed thoroughly by tumbling with 90 parts of powdered isotactic polypropylene of intrinsic viscosity (in Decalin at 135° C.) of 1.3 and melt spun at 180° C. to give 9 denier per filament spun yarn which is drawn 2.5 times at 60° C.

and then heat treated in the relaxed state at 140° C. for 30 minutes.

A hank of the drawn yarn is dyed from an aqueous bath containing Solway Sky Blue BS (C.I. Acid Blue 78) (10% on weight of fibre) and formic acid (85% w./v. solution; 3% on weight of fibre) at 100° C. for 1½ hours, when the dyebath is exhausted. After washing off excess dye using 0.2% by weight of "Lissapol C" (registered trademark) and 0.2% by weight of anhydrous sodium carbonate at 60° C. for 15 minutes the dye concentration in the fibre is measured and found to be greater than 80% of the dye initially present in the dyebath.

EXAMPLE 2

Example 1 is repeated using 0.3 molar aqueous hydrochloric acid and place of the 0.1 molar acid to neutralise a greater proportion, 60%, of the basic groups of the polyamide. Dyeing of a hank of drawn yarn as in Example 1 exhausting the dyebath in 1½ hrs. and after washing off over 80% of the dye initially present in the dyebath remained on the fibre.

EXAMPLE 3

Example 1 is repeating using 0.25 molar aqueous phosphoric acid in place of the 0.1 molar aqueous hydrochloric acid. This quantity of phosphoric acid is enough to convert half the basic amine groups in the basic polyamide into the monoamine dihydrogen phosphate or all the basic amine groups into the diamine monohydrogen phosphate. When dyed as in Example 1 the drawn yarn exhausted the dyebath after 1½ hours and after washing off over 80% of the dye initially present in the dyebath remained in the fibre.

EXAMPLE 4

A mixture of 46.5 parts of bis(hexamethylene)triamine, 29.2 parts of adipic acid and 3.7 parts of phenylphosphonic acid is stirred for 1 hour at 244° C. under an atmosphere of nitrogen.

On analysis the resulting basic polyamide so obtained found to contain 3250 microequivalents of basic groups and 261 microequivalents of acidic groups per gram.

10 parts of the polyamide are mixed with 90 parts of polypropylene and the mixture is passed through a screw extruder at 195° C. and spun into fibres. The fibres are then drawn over a heated pin. The resulting fibres have a much higher affinity for acid dyestuffs than polypropylene fibres which were similarly prepared from a mixture of polypropylene and a basic polyamide prepared as described above except that the 3.7 parts of phenyl-phosphonic acid were omitted.

COMPARATIVE EXAMPLES A AND B

Examples 1, 3 and 4 are repeated omitting the steps of treating the basic polyamide with aqueous hydrochloric and phosphoric acids. The dye affinity of polypropylene filaments containing these un-neutralised polymers is greatly reduced, only 42% of the dye initially present in the dyebaths remaining on the fibre after dyeing and washing off as in Example 1.

COMPARATIVE EXAMPLE C

Yarn, prepared as in Example 3 with the exception that the basic polyamide is not treated with phosphoric acid before incorporation in the polypropylene, is treated at 60° C. in 0.25 molar aqueous phosphoric acid for thirty minutes and dried at 100° C.

The dye affinity of the treated yarn, measured as in Example 1, is only 45% of the dye initially present in the dyebath.

What we claim is:

1. A shaped stereoregular polyolefin article having a high affinity for acid dyestuffs formed by melt fabrication of a polyolefin composition which is a substantially uniform mixture of a polyolefin and the product of reacting a basic polyamide of a polyamine having three or more amino groups, not more than two of which are primary amino groups, the other amino groups being secondary or tertiary groups with a strong acid having a first dissociation constant, measured in water at 25° C., of at least $10^{-3}$ so that at least a part of the basic groups in the said basic polymer are converted into a salt of the strong acid the amount of said product being 0.5–20% by weight of said polyolefin composition, said shaped article containing 70 to 700 micro-equivalents of total basic groups per gram of composition.

2. A shaped article according to claim 1 wherein the strong acid is a member of the group consisting of mineral acids, inorganic oxyacids of phosphorus, organic oxyacids of phosphorus, halogenated aliphatic monocarboxylic acids and aliphatic dicarboxylic acids.

3. A shaped article according to claim 2 wherein the inorganic oxyacid of phosphorus is selected from the group consisting of phosphoric, phosphorous and hypophosphorous acids.

4. A shaped article according to claim 2 wherein the organic oxyacid of phosphorus is a member of the group consisting of alkylphosphoric acids and phosphonic acids represented by the formula:

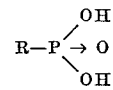

wherein R is an optionally substituted aliphatic or aryl radical.

5. A shaped article according to claim 1 wherein the basic polymer is one which is substantially insoluble in water and which has a crystallite melting point of 50–250° C.

6. A shaped article according to claim 1 wherein the polyolefin is a member of the group consisting of linear polyethylene, stereoregular 4-methyl-pentene-1 and isotactic polypropylene.

7. A process for the production of a stereoregular polyolefin composition having a high affinity for acid dyestuffs and capable of being formed into shaped articles by melt spinning extrusion or other shaping processes comprising treating a basic polyamide of a polyamine having three or more amine groups, not more than two of which are primarily amino groups, the other amino groups being secondary or tertiary groups, with a strong acid having a first dissociation constant, measured in water at 25° C. of at least $10^{-3}$ so that some or all of the basic groups in the said basic polymer are converted into a salt of the strong acid and incorporating the treated basic polymer into a stereoregular olefin polymer in an amount of 0.5–20% by weight of the composition which provides 70 to 700 micro-equivalents of total basic groups per gram of composition.

8. A process according to claim 7 wherein the strong acid is a member of the group consisting of mineral acids, inorganic oxyacids of phosphorus, organic oxyacids of phosphorus, halogenated aliphatic monocarboxylic acids and aliphatic dicarboxylic acids.

9. A process according to claim 8 wherein the inorganic oxyacid of phosphorus is selected from the group consisting of phosphoric, phosphorous and hypophosphorous acids.

10. A process according to claim 8 wherein the organic oxyacid of phosphorus is a member of the group consisting of alkylphosphoric acids and phosphonic acids represented by the formula:

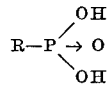

wherein R is an optionally substituted aliphatic or aryl radical.

11. A process according to claim 7 wherein the basic polymer is one which is substantially insoluble in water and which has a crystallite melting point of 50–250° C.

12. A process according to claim 7 wherein the polyolefin is a member of the group consisting of linear polyethylene, stereoregular 4-methyl-pentene-1 and isotactic polypropylene.

References Cited

UNITED STATES PATENTS

| | | | |
|---|---|---|---|
| 3,361,843 | 1/1968 | Miller | 260—857 |
| 3,161,608 | 12/1964 | Caldwell | 260—857 |
| 3,236,918 | 2/1966 | Tsunoda | 260—897 |
| 3,433,853 | 3/1969 | Earle | 260—857 |

SAMUEL H. BLECH, Primary Examiner

PAUL LIEBERMAN, Assistant Examiner

U.S. Cl. X.R.

8—55; 260—37, 41, 75, 77.5, 78, 859, 873, 897